United States Patent [19]

Kishimoto et al.

[11] Patent Number: 4,884,540

[45] Date of Patent: Dec. 5, 1989

[54] ENGINE SPEED CONTROL METHOD

[75] Inventors: Yuji Kishimoto; Masanobu Uchinami, both of Hyogo, Japan

[73] Assignee: Mitsubishi Denki Kabushiki Kaisha, Tokyo, Japan

[21] Appl. No.: 163,019

[22] Filed: Mar. 2, 1988

[30] Foreign Application Priority Data

Mar. 9, 1987 [JP] Japan .................................. 62-53618

[51] Int. Cl.[4] .............................................. F02D 41/16
[52] U.S. Cl. .................................... 123/339; 123/418
[58] Field of Search ................................ 123/339, 418

[56] References Cited

U.S. PATENT DOCUMENTS

| | | | |
|---|---|---|---|
| 4,328,775 | 5/1982 | Ironside | 123/418 X |
| 4,344,397 | 8/1982 | Geiger et al. | 123/339 |
| 4,446,832 | 5/1984 | Matsumura et al. | 123/418 X |
| 4,506,639 | 3/1985 | Nurakami et al. | 123/418 X |

Primary Examiner—Tony M. Argenbright
Attorney, Agent, or Firm—Lowe, Price, LeBlanc, Becker & Shur

[57] ABSTRACT

In an engine speed control method including detecting a signal representing an error between an actual engine speed and a desired idling speed, and controlling both an ignition timing of an engine according to the error signal and an intake air quantity or an air/fuel mixture quantity to be sucked into the engine in order to make an engine speed to the desired engine speed; the improvement comprising the step of correcting the intake air quantity and the air/fuel mixture quantity to the engine according to an ignition timing error signal representing an error between an actual ignition timing of the engine and an ignition timing predetermined in accordance with an engine operation condition.

3 Claims, 5 Drawing Sheets

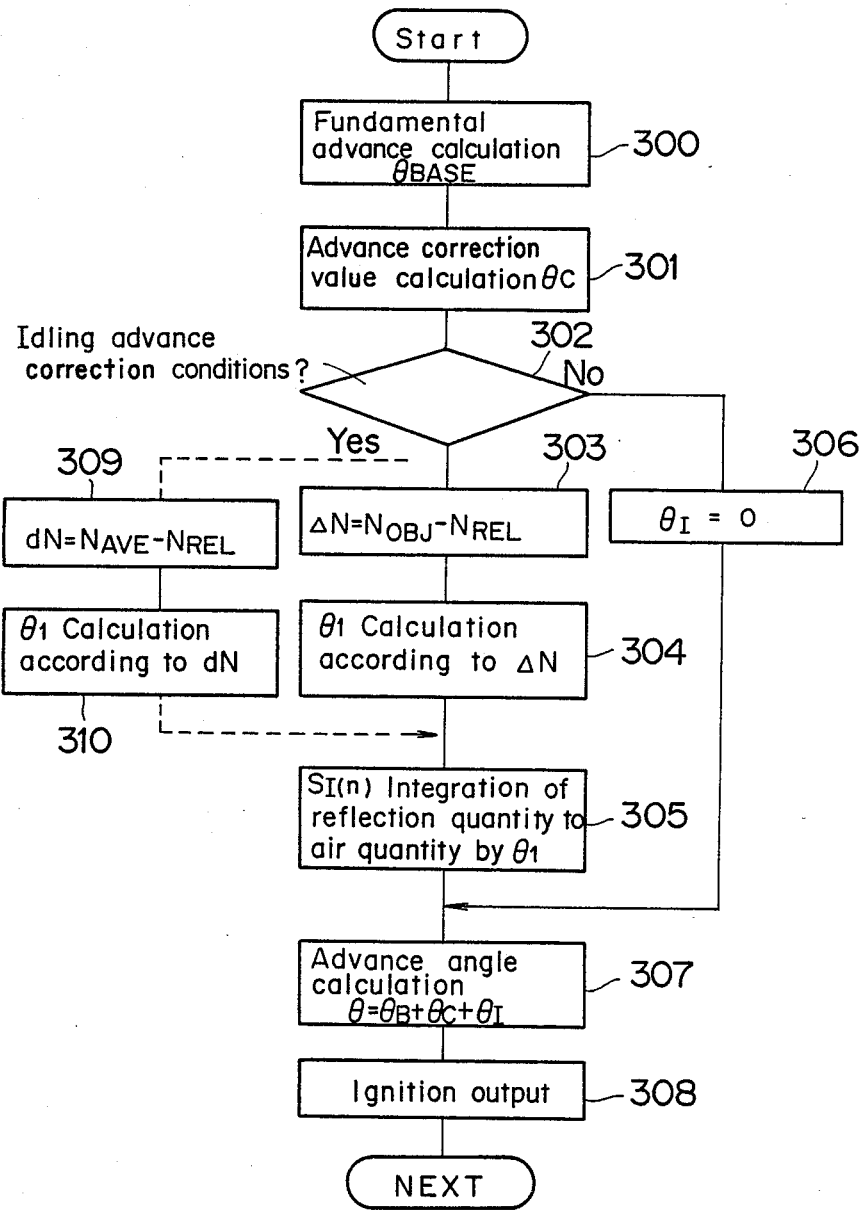

ENGINE SPEED CONTROL METHOD

BACKGROUND OF THE INVENTION

The present invention relates to an engine speed control method, and more particularly to an idling speed control method.

Conventionally, there have been proposed various idling speed control methods combining control of air supply to an engine by mechanically adjusting a throttle butterfly valve or an auxiliary valve bypassing the throttle butterfly valve by an electrical signal and control of an ignition timing according to an error signal between an acutal engine speed and a target idling speed. In these conventional methods, the air supply to the engine is preferentially dependent upon a response delay of an intake system and a fuel system. Therefore, even when a drop and a fluctuation in engine speed are detected to correct an intake air quantity or an air/fuel mixture quantity, a great effect in control of the idling speed cannot be obtained. Accordingly, the conventional methods are designed to prevent the occurrence of the drop and the fluctuation in engine speed by correcting an ignition timing according to a deviation between the actual engine speed and a target engine speed.

However, in the conventional methods, the correction of the ignition timing causes the actual engine speed to be converged to the target engine speed in a very short time. Therefore, there is a problem that before the intake air quantity or the air/fuel mixture quantity to the engine is not sufficiently adjusted, the engine is rendered stable. That is, the engine speed in itself should be controlled in accordance with the intake air quantity or the air/fuel mixture quantity to the engine, but it is forcibly controlled in accordance with the ignition timing the conventional methods, causing fuel wastage or noxious exhaust emissions at idling.

SUMMARY OF THE INVENTION

Accordingly, it is an object of the present invention to provide an engine speed control method which prevents a drop and a fluctuation in engine speed and also prevents fuel wastage and noxious exhaust emissions.

According to the present invention, there is provided an engine speed control method comprising a step of correcting an intake air quantity or an air/fuel mixture quantity to be admitted to an engine in accordance with a deviation between an actual ignition timing and an ignition timing predetermined according to an engine operational condition.

In operation, when there occurs a drop or a fluctuation in engine speed, both an ignition timing and intake air quantity or air/fuel mixture quantity to the engine are adjusted. At the same time, the intake air quantity or the air/fuel mixture quantity is adjusted in accordance with a correction value of the ignition timing. Accordingly, it is quickly adjusted on concert with the correction of the ignition timing, and there is no problem that the engine speed is forcibly adjusted by the adjustment of the ignition timing. As a result, it is possible to prevent the drop and the fluctuation in engine speed and also prevent the fuel wastage and noxious exhaust emissions.

Other objects and features of the invention will be more fully understood from the following detailed description and appended claims when taken with the accompanying drawings.

BRIEF DESCRIPTION OF THE DRAWINGS

FIG. 4 is a flow chart of an ignition timing computing routine according to the present invention;

DETAILED DESCRIPTION OF THE PREFERRED EMBODIMENTS

There will now be described the preferred embodiments of the present invention with reference to the drawings. In the preferred embodiments, the engine speed is controlled at engine idling by combining air flow control in a bypass air passage and ignition timing control.

Figure 1:
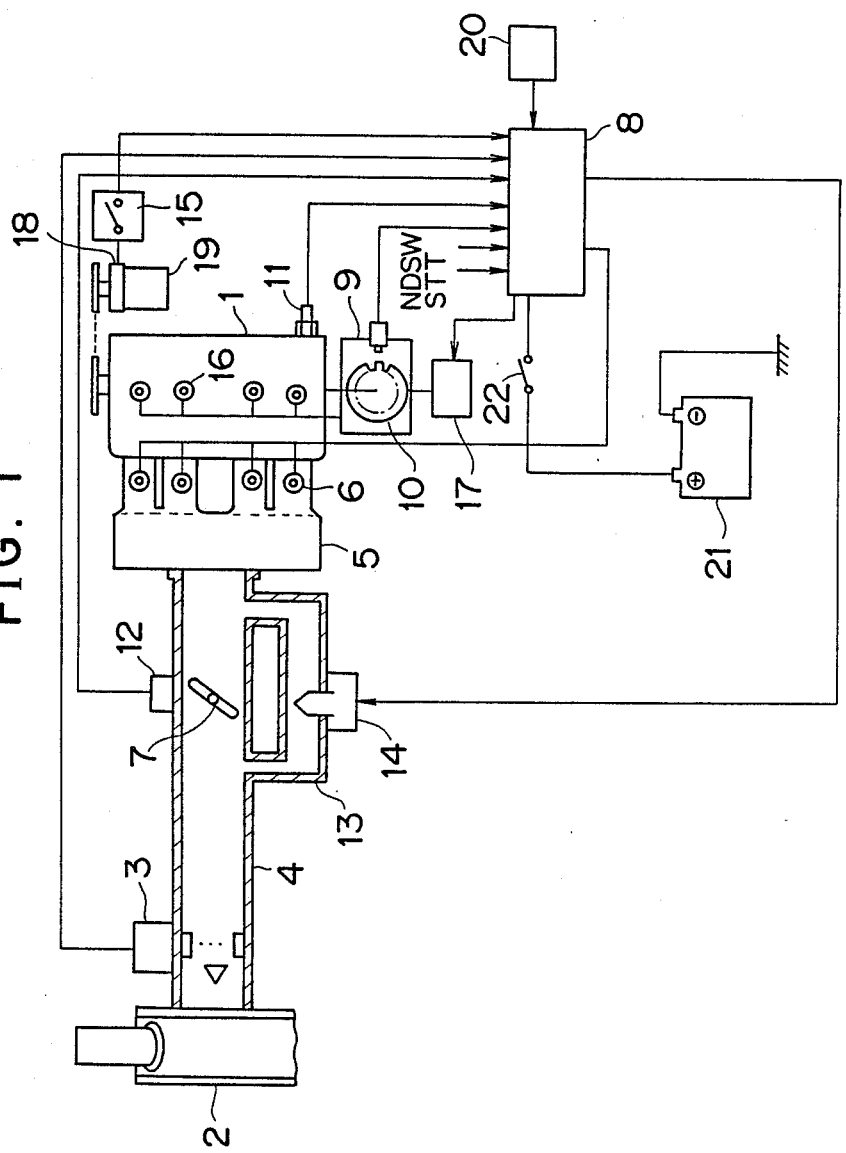
FIG. 1 is a schematic illustration of an engine speed control device according to the present invention.

Referring to FIG. 1, air is sucked through an air cleaner 2, air flow sensor 3, intake pipe 4 and intake manifold 5 into an engine 1, while fuel is injected to be supplied to the engine 1 from a plurality of electromagnetic fuel injection valves 6 provided in the intake manifold 5. The air flow sensor 3 is attached to the intake pipe 4 to detect an intake air quantity. The intake air quantity to the engine 1 is mainly regulated by a throttle valve 7 to be arbitrarily operated by an accelerator pedal (not shown), while a fuel injection quantity is regulated by a microcomputer 8. The microcomputer 8 decides the fuel injection quantity in accordance with fundamental parameters consisting of an engine speed to be detected by an optical slit 10 as an engine speed sensor provided in a distributor 9 and the intake air quantity to be measured by the air flow sensor 3. Further, the microcomputer 8 receives signals from an engine warm-up sensor 11 for detecting an engine cooling water temperature or the like to thereby increase and decrease the fuel injection quantity. An idle switch 12 is provided to detect full closure of the throttle valve 7. A bypass pipe 13 is so provided as to bypass the throttle valve 7 in the intake pipe 4. An air quantity control valve 14 is provided in the bypass pipe 13. That is, one end of the bypass pipe 13 is connected to the intake pipe 4 between the throttle valve 7 and the air flow sensor 3, while the other end is connected to the intake pipe 4 downstream of the throttle valve 7. The air quantity control valve 14 is controlled by a step motor, and is connected to the microcomputer 8. The excitation of a solenoid coil in each phase of the step motor is controlled by the microcomputer 8 to advance and retract the valve. The microcomputer 8 is connected to the air flow sensor 3, the optical slit 10, the engine warm-up sensor 11, the idle switch 12 and an air conditioning switch 15 of an air conditioner such as an automotive air conditioner, and receives signals there-from. The other signals such as a starter signal STT of the engine 1 and a neutral safety signal NDSW of an automatic transmission are input to the microcomputer 8.

The optical slit 10 is mounted on a shaft of the distributer 9 rotating synchronously with a crankshaft of the engine 1, and generates pulse signals with a frequency proportional to the engine speed. The engine warm-up sensor 11 is a temperature sensing element such as a thermistor, and detects a cooling water temperature, for example, representing an engine temperature. The distributor 9 has a known structure distributing high voltages to ignition plugs 16. An ignition device 17 receives signals indicative of an ignition timing and a conduction time from the microcomputer 8, and generates a high voltage in accordance with the signals. Generally, the ignition device 17 is constituted of an ignitor (ignition control device) and an ignition coil. Reference numerals 18 and 19 designate an electromagnetic clutch and a compressor for the air conditioner.

Figure 2:
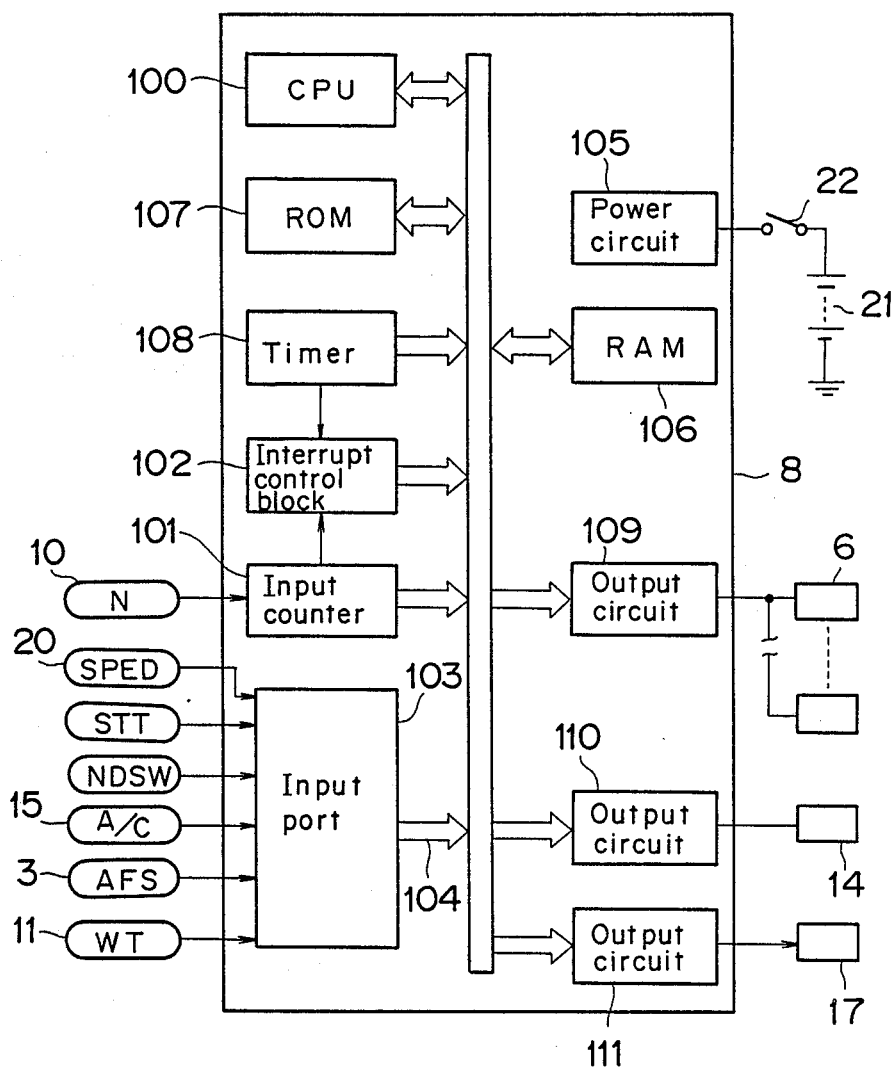
FIG. 2 is a block diagram of a microcomputer according to the present invention.

FIG. 2 is a block diagram of the microcomputer 8. A microcomputer (CPU) 100 computes an ignition timing, fuel injection quantity and idling speed control quantity in accordance with a predetermined program. An input counter 101 is provided to feed a data representing an engine speed N to the CPU 100. The input counter 101 counts clock pulses to obtain the data in accordance with the pulse signals from the optical slit 10. Further, the counter 101 feeds an interrupt command signal to an interrupt control block 102 in synchronism with the rotation of the engine 1. When the interrupt control block 102 receives the interrupt command signal, it outputs an interrupt signal to the CPU 100. An input port 103 is provided to transmit the signals from the above-mentioned sensors through a bus 104 to the CPU 100. The input port 103 is comprised of an A/D converter or the like, and receives an intake air quantity signal AFS from the air flow sensor 3, a cooling water temperature signal WT from the engine warm-up sensor 11, an air conditioning signal A/C from the air conditioning switch 15, a neutral signal NDSW from the automatic transmission, a vehicle speed signal SPED from the vehicle speed meter 20, a starter signal STT from the engine starter switch, etc. A power circuit 105 is provided to provide constant voltage for other circuits in microcomputer 8. The power circuit 105 is connected through an engine key switch 22 to battery 21. A random access memory (RAM) 106 is a read-/write memory to be temporarily used in the execution of a program by the CPU 100. A read only memory (ROM) 107 is a memory for preliminarily storing the program and various constants, etc. The CPU 100 reads the data through the bus 104. A timer 108 is a circuit for generating a clock pulse and measuring an elapsed time. The timer 108 outputs a clock signal to the CPU 100 and a time interrupt signal to the interrupt control block 102. An output circuit 109 is constituted of a latch, downcounter and power transistor, etc. The output circuit 109 generates a pulse signal having a width in accordance with a data representing the fuel injection quantity computed by the CPU 100, and applies the pulse signal to the fuel injection valve 6. Similarly to the output circuit 109, an output circuit 110 is constituted of a latch and power transistor, etc. The output circuit 110 generates a number of pulse signals corresponding to the control quantity of the idling speed in accordance with a data representing the control quantity computer by the CPU 100, and applied the pulse signals to the air quantity control valve 14 to thereby advance or retract the valve 14. Similarly to the output circuit 109, an output circuit 111 is constituted of a latch, downcounter and power transistor, etc. The output circuit 111 generates an ignition timing signal corresponding to the control quantity of ignition timing in accordance with an ignition timing data computer by the CPU 100, and feeds the ignition timing signal to the ignition device 17.

Figure 3:
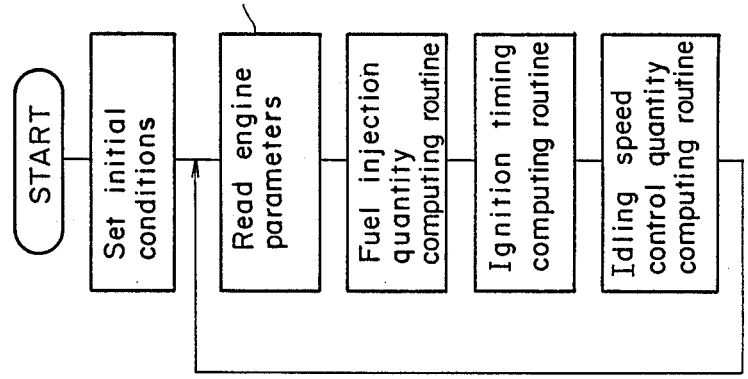
FIG. 3 is a flow chart of a general operation of the microcomputer shown in FIG. 2.

In operation, the CPU 100 executes the computing of fuel injection quantity, ignition timing and idling speed control quantity in a main routine shown in FIG. 3. The other arithmetic processings of specific parameters such as engine speed and predetermined time are executed in an interrupt routine.

When the key switch 22 is turned on, the CPU 100 starts executing each operation routine. First, an ignition timing computing routine will now be described with reference to FIG. 4. In the ignition timing computer routine, a basic ignition timing value $\theta_{BASE}$ corresponding to a current operational condition is computed in step 300 from a basic ignition timing map as a function of intake air quantity Q and engine speed N, in accordance with the engine parameters read out in step 200. In step 301, ignition ignition timing correction values $\theta_C$ are computed in accordance with the engine parameters such as engine warm-up advance correction preliminarily stored in a correction map, for example. In step 302, it is determined whether or not idling ignition timing correction control is to be executed. In this step, it is inspected that the cooling water temperature is not less than a set temperature to indicate sufficient engine warm-up, and that the throttle valve 7 is in a full closed or substantially full closed condition to indicate engine idling condition, and that the vehicle is in a stopped or substantially stopped condition. If all of these conditions is satisfied, steps 303–305 are executed, and if any one of these conditions is not satisfied, the program proceeds to step 306. Accordingly, if the engine is not in an idling condition, an idling ignition timing correction value $\theta_I$ is set to 0, and then instep 307, the basic ignition timing value $\theta_{BASE}$, the various igntion timing correction values $\theta_C$ and the idling ignition timing correction value $\theta_I$ (which is currently equal to 0) are summed to obtained an ignition timing value $\theta$. In step 308, the ignition timing value $\theta$ is output as an ignition timing signal to the output circuit 111, and an output timing is controlled to carry out the ignition with the ignition timing value $\theta$ at the ignition device 17.

Figure 6:
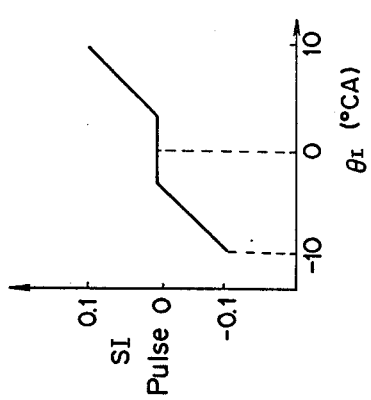
FIG. 5 and 6 are characteristic graphs in the ignition timing computing routine according to the present invention.
Figure 5:
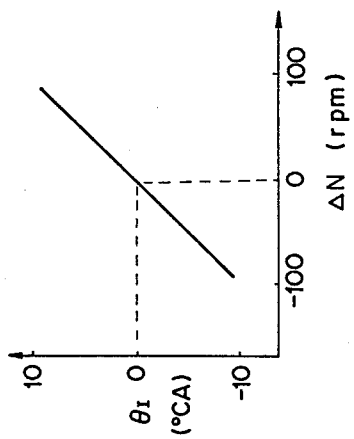
Figure 7:
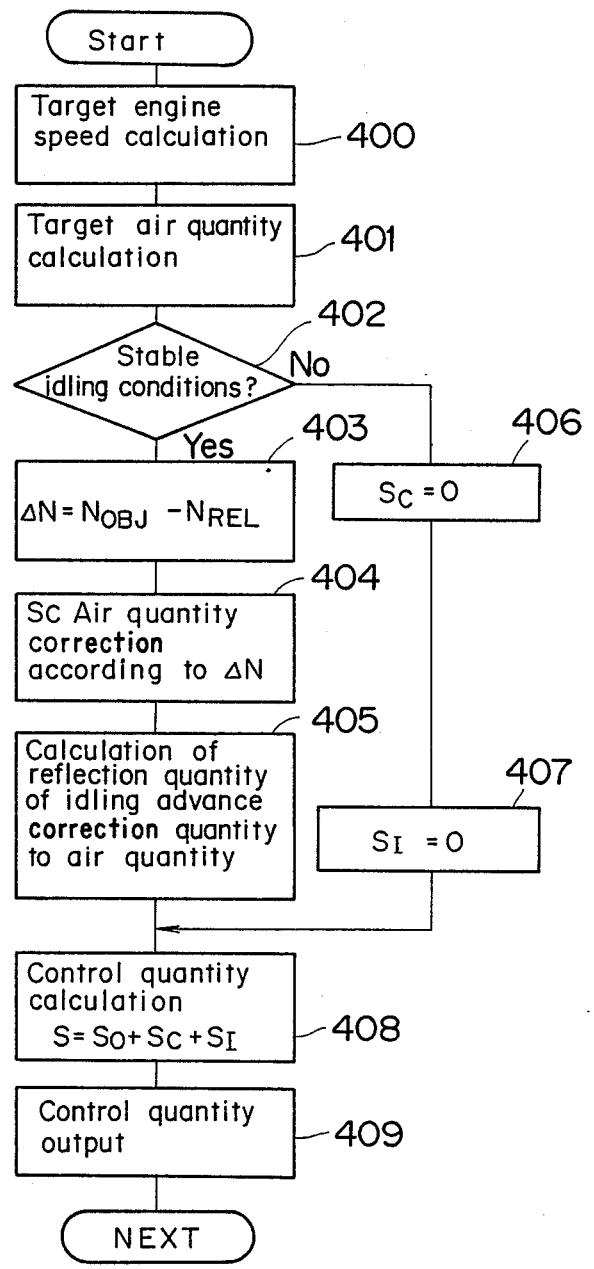
FIG. 7 is a flow chart of an idling speed control quantity computing routine according to the present invention.

On the other hand, if the engine is in the idling condition, the program proceeds to step 303. In step 303, a latest engine speed $N_{REL}$ obtained in step 200 shown in FIG. 3 and a latest target engine speed $N_{OBJ}$ obtained in step 400 of an idling speed control quantity computing routine to be hereinafter described with reference to FIG. 7 are read out to compute a deviation $\Delta N = N_{OBJ} - N_{REL}$ between both the engine speeds. Then, in step 304, the idling ignition timing correction value $\theta_I$ is obtained from a $\Delta N - \theta_I$ map shown in FIG. 5 according to the deviation $\Delta N$. Then, in step 305, a reflection value $S_I$ to the intake air quantity is obtained from a $\theta_I$ map shown in FIG. 6, and it is integrated to obtain $S_I(n)$. When the integral is reflected on the intake air quantity in step 405 shown in FIG. 7, the reflection value is cleared. Then, in step 307, the ignition timing value $\theta$ is computed in the same manner as mentioned above, and in step 308, it is output to the output circuit 111 to be latched, and thereafter the ignition is carried out at an output timing from the CPU 100 with the ignition timing value $\theta$. Accordingly, an error signal between an actual ignition timing $\theta$ and a predetermined ignition timing ($\theta_{BASE}+\theta$hd C) in accordance with an engine operational condition becomes $\theta_I$ in this case.

Referring to FIG. 7 which shows the idling speed control quantity computing routine, first in step 400, target engine speeds $N_{OBJ}$ corresponding to various operation modes are computed in accordance with the engine parameters read out in step 200 shown in FIG. 2. For example, the target engine speeds corresponds to various operational conditions are computedr in accordance with the engine cooling water temperature data, the transmission neutral signal of neutral range or drive range, and the air conditioning signal of on or off state, etc. Then, the program proceeds to step 401, where target air quantities $S_O$ corresponding to various operation modes are computed from the water temperature data, the transmission neutral signal and the air conditioning signal, etc. in the same manner as in step 400. Then, in step 402, it is determined whether or not the engine is in the stable idling condition. For example, it is determined that the air conditioning signal and the transmission neutral signal are not changed from the previous state, and that the engine warm-up is sufficient. If these conditions are all satisifed, it is determined that the engine is in the stable idling condition, and then the program proceeds to step 403. On the other hand, if these conditions are not satisfied, the program proceeds to step 406.

Figure 8:
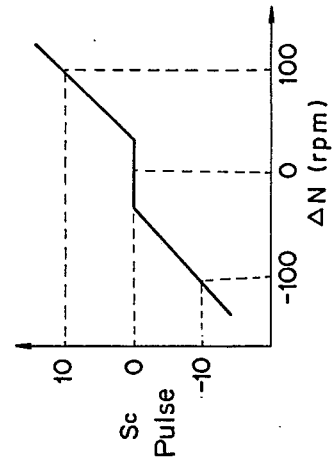
FIG. 8 is a characteristic graph in the idling speed control quantity computing routine according to the present invention.

In step 403, a deviation $\Delta N$ ($\Delta N=N_{OBJ}-N_{REL}$) between the latest engine speed $N_{REL}$ obtained in step 200 shown in FIG. 3 and the target engine speed $N_{OBJ}$ obtained in step 400 is computed. In step 404, an air quantity correction value $S_C$ is obtained from a $\Delta N$ map shown in FIG. 8 in accordance with the deviation $\Delta N$ obtained in step 404. Then, in step 405, it is determined whether or not the integral of the idling ignition timing correction obtained in step 305 is equal to or greater than ±1 pulse as a mininum unit for driving the air quantity control valve 14. If the integral is equal to or greater than ±1 pulse, a value integer multiple of the minimum unit for driving the air quantity control valve 14 is set as a reflection value $S_I$ of the idling ignition timing control quantity $\theta_I$ to the air quantity, and the integral $S_I(n)$ obtained in step 305 shown in FIG. 4 is moved to the reflection value $S_I$. In step 408, the target air quantity $S_O$, the correction air quantity $S_C$ and the reflection air quantity $S_I$ of the ignition timing control quantity are summed to obtain a control air quantity S. In step 409, the control air quantity S is output to the output circuit 110 to be latched. Then, an output phase of the output circuit 110 is controlled in accordance with the output timing command from the CPU 100 to thereby advance or retract the air quantity control valve 14 according to the control air quantity S.

On the other hand, if it is determined in step 402 that the engine is not in the stable idling condition, the correction air quantity $S_C=0$ is set in step 406 and the reflection air quantity $S_I=0$ is set in step 407. Then, the program proceeds to step 408, where the control air quantity S is computed in the same manner as the above, and in step 409, it is output to the output circuit 110 to be latched, thereafter carrying out the operation of the air quantity control valve 14 at the output timing from the CPU 100.

After terminating the computing of the ignition timing and the idling speed control quantity in this manner, the engine parameters are read again to continue to execute the computing of fuel injection quantity and a series of related proceedings. A fuel injection quantity computing routine is a known routine wherein a basic injection time is obtained from the engine speed N and the intake air quantity Q, and it is corrected in accordance with the engine parameters such as cooling water temperature and intake air temperature. Therefore, the description of this known routine will be omitted herein.

Figure 9:
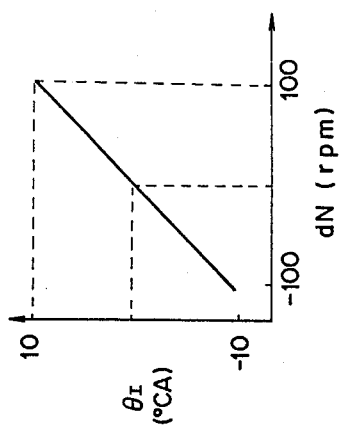
FIG. 9 is a characteristic graph in the ignition timing computing routine of another embodiment of the present invention.

In the aforementioned preferred embodiment, the deviation $\Delta N$ between the target engine speed $N_{OBJ}$ and the latest engine speed $N_{REL}$ is obtained, and the ignition timing correction value $\theta_I$ is obtained from the $\Delta N$ map to correct the idling ignition timing angle. The same effect may be obtained by a modified embodiment wherein steps 309 and 310 shown in FIG. 4 are substituted for steps 303 and 304, and a $\Delta N$ map shown in FIG. 9 is substituted for the $\Delta N$ map. That is, instead of the deviation $\Delta N$, a deviation $dN = N_{AVE}-N_{REL}$ between an average $N_{AVE}$ of the engine speeds previously obtained and the latest engine speed $N_{REL}$ is obtained, and the advance correction value $\theta_I$ is obtained in accordance with the deviation $dN$ from the $dN$ map shown in FIG. 9. Further, although the above-mentioned embodiments employ the electronically controlled fuel injection mechanism and the bypass pipe 13 for controlling the air flow, the fuel injection mechanism and the bypass pipe 13 may be replaced by a carburetor and means for adjusting an opening angle of the throttle valve 7, respectively.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In an engine speed control method including detecting a signal representing an error between an actual engine speed and a desired idling speed, and controlling both an ignition timing of an engine according to said error signal and at least one of an intake air quantity or an air/fuel mixture quantity to be admitted to said engine in order to make an engine speed equal to said desired idling speed; the improvement comprising the step of correcting said intake air quantity and said air/fuel mixture quantity to said engine according to an ignition timing error signal representing an error between an actual ignition timing of said engine and an ignition timing predetermined in accordance with an engine operational condition.

2. The engine speed control method as defined in claim 1, wherein said correction step comprises an ignition timing correction to be carried out by obtaining a deviation between a target engine speed and a latest engine speed and obtaining an advance correction value in accordance with the deviation from a deviation map.

3. The engine speed control method as defined in claim 1, wherein said correction step comprises an ignition timing correction to be carried out by obtaining a deviation between an average of engine speeds previously obtained and a latest engine speed and obtaining an advance correction value in accordance with the deviation from a deviation map.

* * * * *